US012625446B2

(12) United States Patent
Okano

(10) Patent No.: US 12,625,446 B2
(45) Date of Patent: May 12, 2026

(54) IMAGE FORMING APPARATUS CONTROLLING CONVEYANCE SPEED

(71) Applicant: Konica Minolta, Inc., Tokyo (JP)

(72) Inventor: Nobuhiko Okano, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/505,186

(22) Filed: Nov. 9, 2023

(65) Prior Publication Data

US 2024/0160140 A1 May 16, 2024

(30) Foreign Application Priority Data

Nov. 14, 2022 (JP) ................................ 2022-181476

(51) Int. Cl.
*G03G 15/00* (2006.01)

(52) U.S. Cl.
CPC ..... *G03G 15/5008* (2013.01); *G03G 15/5041* (2013.01); *G03G 15/6517* (2013.01); *G03G 15/6529* (2013.01); *G03G 15/6588* (2013.01); *G03G 2215/00662* (2013.01); *G03G 2215/00679* (2013.01)

(58) Field of Classification Search
None
See application file for complete search history.

(56) References Cited

U.S. PATENT DOCUMENTS 9,519,255 B2 * 12/2016 Sasaki ................ G03G 15/6588
11,231,670 B2 * 1/2022 Okuzawa ............. G03G 15/652
11,856,168 B2 * 12/2023 Fujimori ............ H04N 1/00986

FOREIGN PATENT DOCUMENTS

CN 101722739 A * 6/2010 ............ B41J 11/007
JP 4696626 6/2011
JP 2017-009651 1/2017
JP 2020-122859 8/2020

OTHER PUBLICATIONS

Translation of CN-101722739-A.*

* cited by examiner

*Primary Examiner* — Arlene Heredia Ocasio
(74) *Attorney, Agent, or Firm* — BakerHostetler

(57) ABSTRACT

An image forming apparatus may include a conveyor conveying continuous paper. The apparatus may also include a speed detector that contacts the continuous paper conveyed by the conveyor to detect a conveyance speed of the continuous paper. The apparatus may also include a hardware processor that controls the conveyor based on a detection result detected by the speed detector so that the conveyance speed of the continuous paper reaches a target value. The hardware processor may adjust the target value based on at least one of information about the continuous paper and information about a job.

14 Claims, 7 Drawing Sheets

| THICKNESS [μm] | LARGE COVERAGE | | SMALL COVERAGE | |
|---|---|---|---|---|
| | FRICTION COEFFICIENT: SMALL | FRICTION COEFFICIENT: LARGE | FRICTION COEFFICIENT: SMALL | FRICTION COEFFICIENT: LARGE |
| 10 - 40 | 0.2% | 0.0% | 0.3% | 0.1% |
| 41 - 65 | 0.2% | 0.0% | 0.3% | 0.1% |
| 66 - 75 | 0.2% | 0.0% | 0.3% | 0.1% |
| 76 - 85 | 0.2% | 0.0% | 0.3% | 0.1% |
| 86 - 95 | 0.2% | 0.0% | 0.3% | 0.1% |
| 96 - 105 | 0.1% | -0.1% | 0.2% | 0.0% |
| 106 - 120 | 0.1% | -0.1% | 0.2% | 0.0% |
| 121 - 190 | 0.1% | -0.1% | 0.2% | 0.0% |
| 191 - 230 | 0.0% | -0.2% | 0.1% | -0.1% |
| 231 - 270 | 0.0% | -0.2% | 0.1% | -0.1% |
| 271 - 310 | 0.0% | -0.2% | 0.1% | -0.1% |
| 311 - 450 | 0.0% | -0.2% | 0.1% | -0.1% |

| PRESSING FORCE: LARGE | PRESSING FORCE: SMALL |
|---|---|
| +0.1% | −0.1% |

IMAGE FORMING APPARATUS CONTROLLING CONVEYANCE SPEED

CROSS-REFERENCE TO RELATED APPLICATIONS

This application claims priority to Japanese Patent Application No. 2022-181476 filed on Nov. 14, 2022, the entire disclosure of which is incorporated herein by reference.

BACKGROUND

Technical Field

The present disclosure relates to the image forming apparatus and recording medium.

Description of the Related Art

The image forming apparatus according to electrophotographic process executes a print job for printing toner images on conveyed paper. The printing is performed as follows.

That is, a toner image is formed on an image carrier such as a rotating photoreceptor or an intermediate transfer belt. Then, the toner image on the image carrier is transferred onto paper passing between the image carrier and the transfer member opposite thereto at a transfer position on the image carrier. Then, the paper after the transfer is conveyed while being nipped by a pair of fixing members which are disposed so as to face each other at a fixing position in a fixer, for example, a fixing roller on a driving side and a pressing roller on a driven side, and thus the toner image on the paper is heated and pressurized to be fixed on the paper.

When a toner image is printed on continuous paper in an image forming apparatus as described above, the paper is loosened between the transfer position and the fixer if a conveyance speed of the paper is low to a surface speed of the image carrier. As a result, a defect such as a fixing wrinkle occurs.

On the other hand, if the conveyance speed of paper is too high to the surface speed of the image carrier, a defect such as a transfer deviation or a color shift (deterioration in color resist performance) occurs when the toner image is transferred onto the paper.

With respect to this issue, JP 4696626 A and JP 2017-009651 A describe control such that a conveyance speed of paper is increased by a predetermined value to a surface speed of an image carrier.

Further, JP-A-2020-122859 describes that speed variation due to a fixing roller is corrected and a conveyance speed of paper is controlled to be constant.

SUMMARY

However, a surface speed of an image carrier and a conveyance speed of paper may differ by more than a predetermined value due to component variations in components related to control of the surface speed of the image carrier and the conveyance speed of the paper (for example, an outer diameter of a drive roller of a transfer member or the image carrier, and a thickness of the image carrier or the transfer member).

As an example, a variation of an outer diameter of a speed detection roller 381 that detects a conveyance speed of paper P as shown in FIG. 3 will be described. The paper P is conveyed while being wound around a speed detection roller

381. At this time, the speed detection roller 381 rotates following the conveyance of the paper P, and the conveyance speed of the paper P is detected based on the rotation speed of the rotation following the conveyance of the paper P. Here, if there is a variation in the outer diameter of the speed detection roller 381, an error corresponding to the difference in the outer diameter also occurs in the speed detected by the speed detection roller 381.

In addition, when a thickness T of the paper P is relatively large, an error occurs in the speed detected by the speed detection roller 381.

This is because, as shown in FIG. 3, when the thickness T of the paper P is relatively thick, a difference between a conveyance speed V2 of the paper P detected by the speed detection roller 381 and a conveyance speed V1 (actual speed) at the speed center line of the paper P is relatively large. Here, the conveyance speed V2 of the paper P detected by the speed detection roller 381 is lower than the conveyance speed V1 (actual speed) at the speed center line of the paper P.

The conveyance speed of the paper in the image forming apparatus is controlled based on the speed detected by the speed detection roller 381. Therefore, if an error occurs in the speed detected by the speed detection roller 381, there is a possibility that the conveyance speed of the paper is not controlled at an appropriate speed. Therefore, a difference of a predetermined value or more occurs between the surface speed of the image carrier and the conveyance speed of the paper, and a defect such as a fixing wrinkle or a transfer misalignment may occur.

In U.S. Pat. No. 4,696,626, JP 2017-009651 and JP 2020-122859, the above problem is not considered.

An object of the present disclosure is to provide an image forming apparatus capable of suppressing a defect due to paper conveyance.

To achieve at least one of the abovementioned objects, according to an aspect of the present invention, an image forming apparatus reflecting one aspect of the present invention includes: a conveyor that conveys continuous paper, a speed detector that contacts the continuous paper conveyed by the conveyor to detect a conveyance speed of the continuous paper, and a hardware processor that controls the conveyor based on a detection result detected by the speed detector so that the conveyance speed of the continuous paper reaches a target value, wherein the hardware processor adjusts the target value based on at least one of information about the continuous paper and information about a job.

To achieve at least one of the abovementioned objects, according to an aspect of the present invention, an image forming apparatus reflecting one aspect of the present invention includes: a conveyor that conveys continuous paper, a speed detector that contacts the continuous paper conveyed by the conveyor to detect a conveyance speed of the continuous paper, and a hardware processor that controls the conveyor based on a detection result detected by the speed detector so that the conveyance speed of the continuous paper reaches a target value, wherein the hardware processor adjusts the detection result by the speed detector based on at least one of information about the continuous paper and information about a job.

To achieve at least one of the abovementioned objects, according to an aspect of the present invention, a recording medium reflecting one aspect of the present invention is a non-transitory computer-readable recording medium storing a program which causes a computer of an image forming apparatus including: a conveyor that conveys continuous paper, and a speed detector that contacts the continuous paper conveyed by the conveyor to detect a conveyance speed of the continuous paper, to control the conveyor based on a detection result detected by the speed detector so that the conveyance speed of the continuous paper reaches a target value, and adjust the target value based on at least one of information about the continuous paper and information about a job.

To achieve at least one of the abovementioned objects, according to an aspect of the present invention, a recording medium reflecting one aspect of the present invention is a non-transitory computer-readable recording medium storing a program which causes a computer of an image forming apparatus including: a conveyor that conveys continuous paper, and a speed detector that contacts the continuous paper conveyed by the conveyor to detect a conveyance speed of the continuous paper, to control the conveyor based on a detection result detected by the speed detector so that the conveyance speed of the continuous paper reaches a target value, and adjust the detection result by the speed detector based on at least one of information about the continuous paper and information about a job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments. Although a color image forming apparatus is exemplified in the embodiment of the present invention, the present invention is not limited thereto, and may be applied to, for example, a monochrome image forming apparatus.

1. Configuring Image Forming Apparatus

Figure 1:
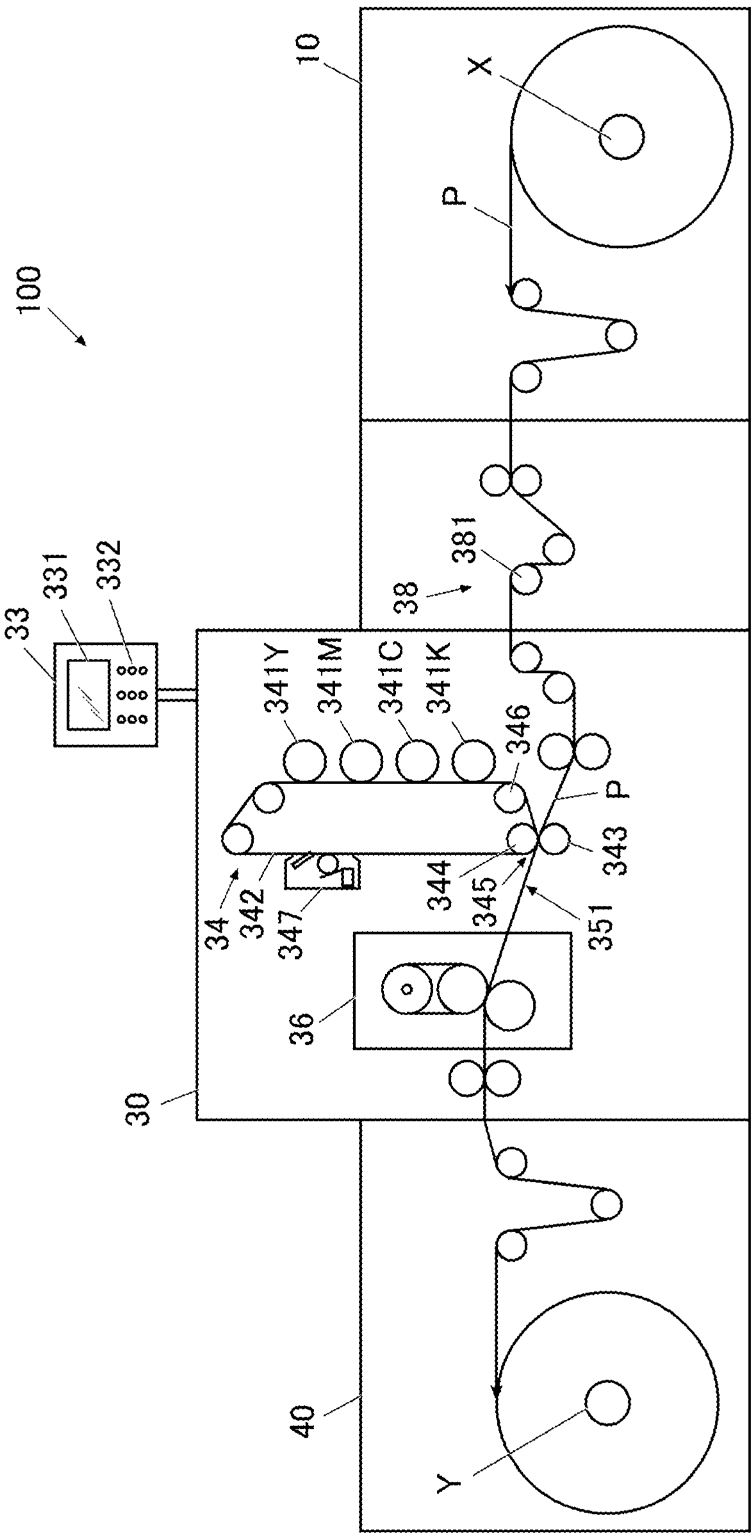
FIG. 1 is a diagram illustrating a schematic configuration of an image forming apparatus according to an embodiment to which the present invention is applied.

FIG. 1 is a diagram illustrating an exemplary entire configuration of an image forming apparatus 100 according to the embodiment.

The image forming apparatus 100 is an apparatus that forms images on paper P that is continuous paper such as roll paper, roll film, or continuous form.

As illustrated in FIG. 1, the image forming apparatus 100 is formed by a paper feeder 10, a main body 30, and a winder 40 that are connected from the upstream side along a conveyance direction of the paper P.

In FIG. 1, the paper feeder 10 and the winder 40 are configured separately from the main body 30.

1-1. Configuration of Paper Feeder

The paper feeder 10 feeds the paper P to the main body 30.

The paper feeder 10 conveys the paper P wound around a support shaft X to the main body 30 at a constant speed by driving a motor (not shown). The operation of the motor of the paper feeder 10 is controlled by a controller 31 (see FIG. 2) included in the main body 30.

1-2. Configuration of Main Unit

The main body 30 forms an image on the paper P conveyed from the paper feeder 10 by an intermediate transfer method using an electrophotographic processing technique.

Figure 2:
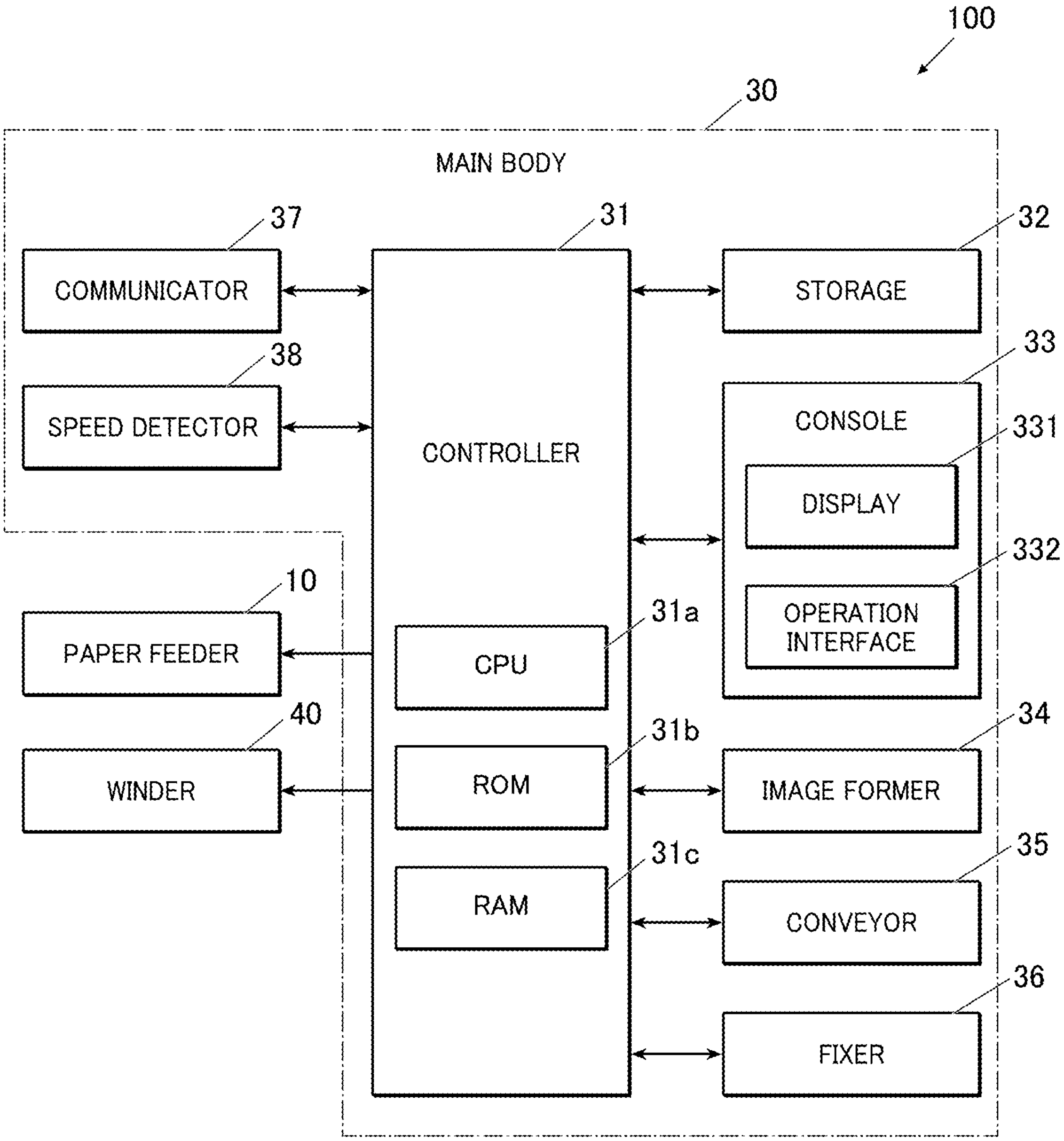
FIG. 2 is a block diagram illustrating a main functional configuration of the image forming apparatus.

As illustrated in FIG. 2, the main body 30 includes a controller 31 (hardware processor), a storage 32, console 33, an image former 34, a conveyor 35, a fixer 36, a communicator 37, and a speed detector 38.

The controller 31 includes a Central Processing Unit (CPU) 31*a*, a Read Only Memory (ROM) 31*b*, a Random Access Memory (RAM) 31*c* or the like.

The CPU 31*a* reads a program corresponding to a process content from the ROM 31*b* or the storage 32, develops the program in a RAM 31*c*, and centrally controls operations of the respective units in the main unit 30, the paper feeder 10, the winder 40, and the like in cooperation with the developed program.

The storage 32 includes, for example, a non-volatile semiconductor memory (so-called flash memory), a hard disk drive, or the like.

The storage 32 stores programs for performing various processes, inputted job information, paper information, document data, various setting information, and picture data.

The storage 32 stores a first correction value table and a second correction value table used in a target value adjustment process described later.

These data and the like may be stored in the ROM 31*b* of the controller 31.

The console 33 includes, for example, a liquid crystal display (LCD: Liquid Crystal Display) with a touch panel, and functions as display 331 and operation interface 332.

The display 331 displays various operation screens, image states, operation states of respective functions, and the like in accordance with display control signals inputted from the controller 31.

The operation interface 332 includes various operation keys such as a numeric keypad and a start key, receives various input operations by the user, and outputs an operation signal to the controller 31.

For example, the image former 34 forms (prints) an image on the paper P based on image data inputted from an external device (such as a personal computer) via the communicator 37.

Specifically, the image former 34 forms color toner images of Y (yellow), M (magenta), C (cyan), and K (black) on photoreceptor drums 341Y, 341M, 341C, 341K, and sequentially performs primary transfer on an intermediate transfer belt 342 (the image carrier) to superimpose the four-color toner images.

Thereafter, the image former 34 forms (prints) images by performing secondary transfer onto the paper P conveyed from the paper feeder 10 with a secondary transfer roller 343 and an opposite roller 344.

After the secondary transfer, residual toner remaining in the intermediate transfer belt 342 is removed by a cleaner 347 on the downstream side.

The intermediate transfer belt 342 is a semiconductive endless belt suspended and rotatably supported by a plurality of rollers including an intermediate transfer driving roller 346 and is driven to rotate as the rollers rotate. The intermediate transfer belt 342 rotates as the rollers rotate during the transfer of the toner image.

Figure 4:
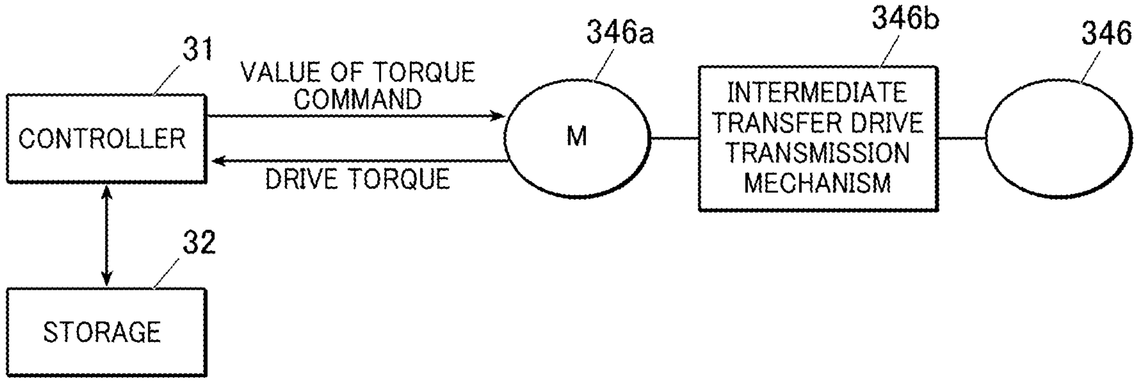
FIG. 4 is a circuit block diagram related to control of an intermediate transfer belt.

FIG. 4 is a circuit-block diagram related to control of the intermediate transfer belt 342 in the image forming apparatus 100.

The controller 31 controls a drive motor or the like that drives the intermediate transfer belt 342.

As illustrated in FIG. 4, an intermediate transfer driving motor 346*a* (driver) for rotationally driving the intermediate transfer driving roller 346 for rotating the intermediate transfer belt 342 is controllably connected to the controller 31.

An intermediate transfer driving roller 346 is connected to a drive shaft of the intermediate transfer driving motor 346*a* via an intermediate transfer drive transmission mechanism 346*b*.

The intermediate transfer driving motor 346*a* is formed by a DC brushless motor.

The controller 31 sends to the intermediate transfer driving motor 346*a* a PWM (Pulse Width Modulation) signal to control a speed and a torque of the intermediate transfer driving motor 346*a*, as a torque command.

The intermediate transfer driving motor 346*a* is driven based on a value of a torque command transmitted from the controller 31, which rotates the intermediate transfer driving roller 346.

Then, the controller 31 acquires, as a drive torque (or information about of a drive torque) of the intermediate transfer driving motor 346*a*, a value of a current applied to the intermediate transfer driving motor 346*a* when the intermediate transfer driving roller 346 is rotated at a predetermined rate.

The intermediate transfer driving motor 346*a* may be provided with a drive torque detector for detecting the drive torque, and the drive torque of the intermediate transfer driving motor 346*a* may be acquired from the drive torque detector.

The secondary transfer roller 343 and the opposite roller 344 constitutes the transfer device, and the secondary transfer roller 343 constitutes the transfer member.

In addition, the secondary transfer roller 343 and the opposite roller 344 form a secondary transfer nip 345 by abutting of the secondary transfer roller 343 against the opposite roller 344.

The controller 31 controls a power supply (not shown) to apply a positive voltage, which has a polarity opposite to a charging polarity of the toner, to the secondary transfer roller 343 so that a predetermined current, which is a transfer current, flows through the secondary transfer nip 345.

The conveyor 35 includes a paper path 351 or the like including a plurality of conveyance rollers.

The conveyor 35 conveys the paper P conveyed from the paper feeder 10 to the main body 30 to the image former 34 under the control of the controller 31 and conveys the paper P on which the toner image is formed in the image former 34 to the fixer 36. Then, the paper P on which the toner images have been fixed is conveyed to the winder 40 in the fixer 36.

The fixer 36 includes a fixing heater, a fixing roller, a fixing external heater, and the like, and thermally fixes the toner image transferred onto the paper P.

The communicator 37 is constituted by a communication control card such as a LAN (Local Area Network) card, for example, and transmits and receives various types of data to and from an external device (for example, a personal computer) connected to a communication network such as a LAN and a WAN (Wide Area Network).

Figure 3:
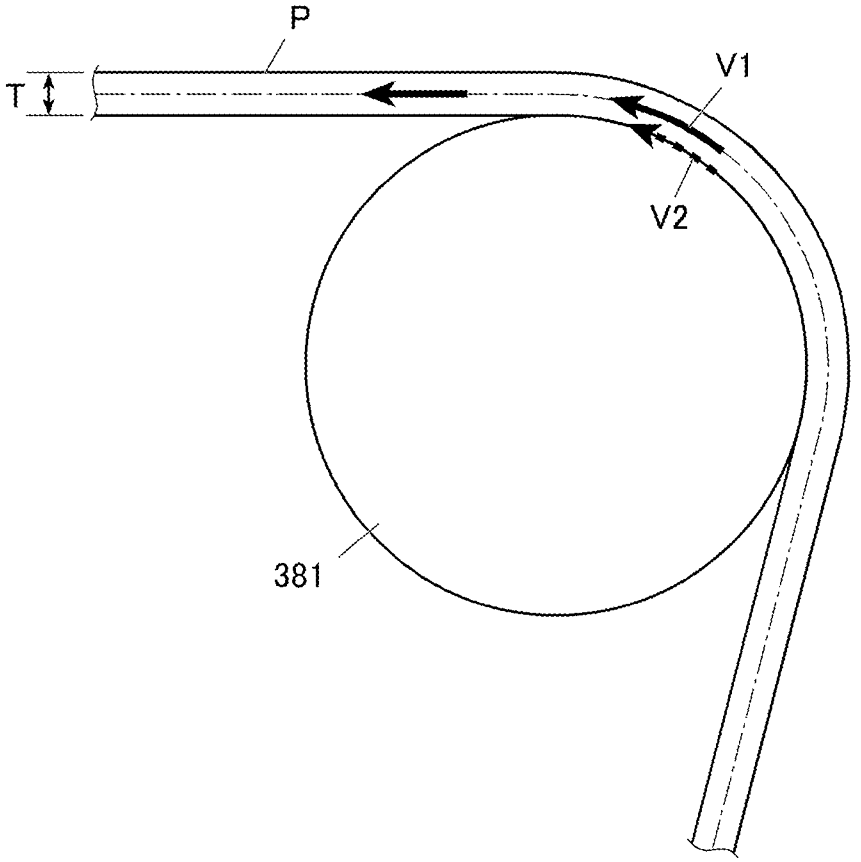
FIG. 3 is a flowchart illustrating a speed detection roller.

As illustrated in FIG. 3, the speed detector 38 includes a speed detection roller 381 that detects a conveyance speed of the paper P while winding and conveying the paper P, and outputs the detection result to the controller 31. That is, the speed detector 38 contacts the paper P (continuous paper) conveyed by the conveyor 35 and detects the conveyance speed of the paper P (continuous paper).

1-3. Configuration of Winder

The winder 40 winds up the paper P conveyed from the main body 30.

The winder 40 winds the paper P conveyed from the main body 30 onto a support shaft Y at a constant speed by driving a motor (not shown). The winding operation of the winder 40 is controlled by the controller 31 included in the main body 30.

2. Operation of Image Forming Apparatus

Next, operation of the image forming apparatus 100 will be described.

Figure 5:
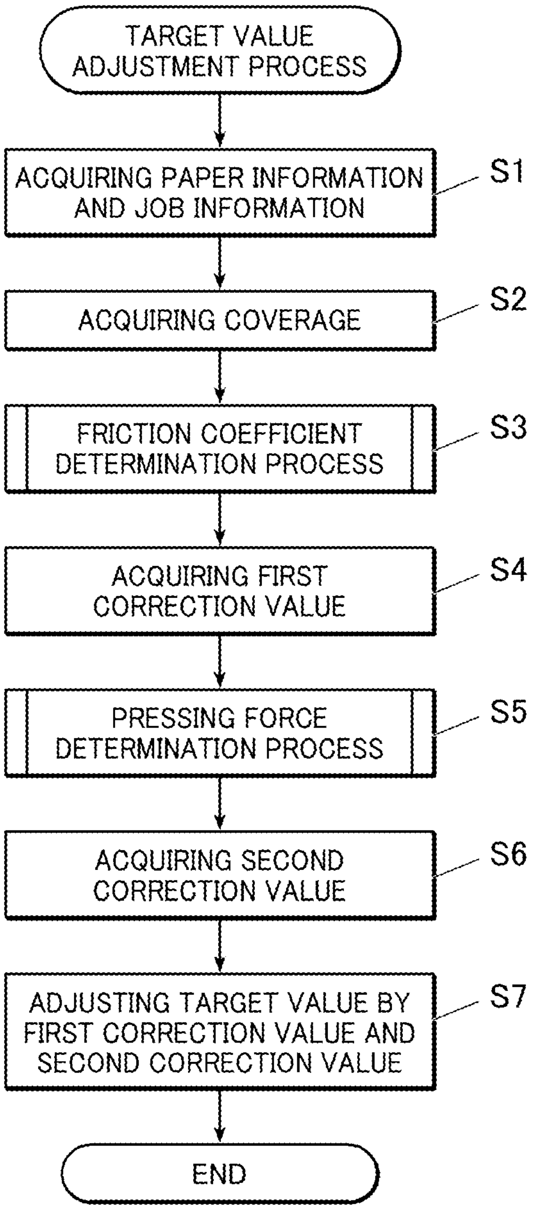
FIG. 5 is a flowchart illustrating a flow of a target value adjustment process.

FIG. 5 illustrates a flow chart of a target value adjustment process performed by the image forming apparatus 100. The target value adjustment process is performed in cooperation with the controller 31 and the program stored in the storage 32 prior to the image forming (printing) operation of the image forming apparatus 100.

The controller 31 adjusts a target value (target speed) with respect to a conveyance speed of the paper P by performing the target value adjustment process.

The controller 31 controls the conveyance rollers of the conveyor 35 so that the conveyance speed of the paper P detected by the speed detector 38 reaches the adjusted target speed during the image forming operation of the image forming apparatus 100.

That is, the controller 31 controls the conveyor 35 based on the conveyance speed of the paper P (continuous paper) detected by the speed detector 38. In addition, the controller 31 can set the conveyance speed of the paper P (continuous paper) to be higher than 23.4 m/min.

Note that prior to the target value adjustment process, the setting value of the surface speed of the intermediate transfer belt 342 and the setting value of the conveyance speed of the paper P are the same as each other.

In the target value adjustment process, first, the controller 31 acquires job information of a print job from an external device (for example, a personal computer) or the like via the communicator 37 and paper information corresponding to the job information (step S1).

The job information in the present embodiment is information related to the job.

The job information includes print image data, various types of setting information, and the like.

The paper information is information of a paper to be printed selected in the print job.

The paper data includes a paper type, a thickness, and a basis weight of the paper (continuous paper).

Next, the controller 31 acquires a coverage in the print image data based on the print image data included in the job information acquired in the step S1 (step S2). Specifically, the controller 31 calculates an average coverage for all the pages in the print image data.

When an image whose coverage is relatively large (larger than a second threshold), there is a high possibility that toner is interposed between the intermediate transfer belt 342 and the paper P at the transfer position. Therefore, if there is a speed difference between the surface speed of the intermediate transfer belt 342 and the conveyance speed of the paper P, the paper P is relatively more slippery to the intermediate transfer belt 342. Here, the second threshold value is set in advance.

On the other hand, when an image whose coverage is relatively small (equal to or smaller than the second threshold value), a relatively small amount of toner is interposed between the intermediate transfer belt 342 and the paper P at the transfer position. Therefore, the paper P is relatively less slippery to the intermediate transfer belt 342.

That is, the coverage indicates smoothness of the paper P (continuous paper) to the intermediate transfer belt 342 (the image carrier) at the transfer position by the transfer device.

Next, the controller 31 performs a friction coefficient determination process of determining whether the friction coefficient of a front surface of the paper P is relatively large or small (step S3).

The paper P having a relatively large friction coefficient is relatively less slippery to the intermediate transfer belt 342 at the transfer position.

On the other hand, the paper P having a relatively small friction coefficient is relatively more slippery to the intermediate transfer belt 342 at the transfer position.

That is, the friction coefficient of the front surface of the paper P indicates smoothness of the paper P (continuous paper) to the intermediate transfer belt 342 (the image carrier) at the transfer position by the transfer device.

Figure 6:
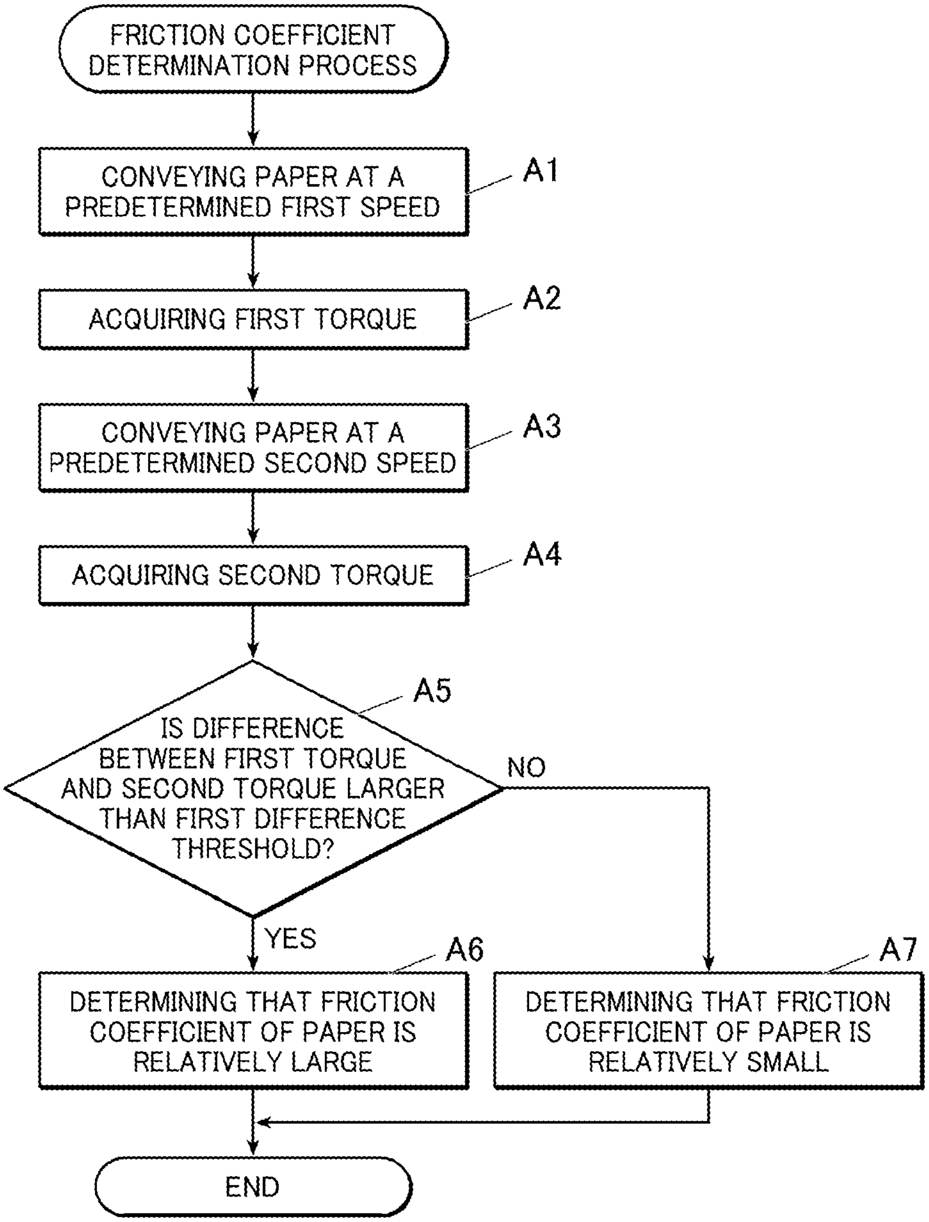
FIG. 6 is a flowchart illustrating a flow of a friction coefficient determination process.

FIG. 6 illustrates a flowchart of the friction coefficient determination process.

In the friction coefficient determination process, the controller 31 sets a setting value of the conveyance speed of the paper P to be a predetermined first speed so as to convey the paper P which is the paper to be printed selected in the print job (step A1). The first speed is, for example, a preset initial speed. Hereinafter, it is assumed that the paper P is a paper to be printed selected in the print job.

Next, the controller 31 acquires the first torque, which is the driving torque of the intermediate transfer driving motor 346*a* when the paper P is conveyed at the first speed (step A2).

Next, the controller 31 sets the setting value of the conveyance speed of the paper P to be a predetermined second speed, which is different from the first speed, so as to convey the paper P (step A3). The second speed is, for example, a speed higher than the first speed by a predetermined value or a speed lower than the first speed by a predetermined value.

Next, the controller 31 acquires the second torque, which is the driving torque of the intermediate transfer driving motor 346*a* when the paper P is conveyed at the second speed (step A4).

Next, the controller 31 determines whether the difference between the first torque acquired in step A2 and the second torque acquired in step A4 is larger than a predetermined first difference threshold (step A5). The first difference threshold is set in advance.

When the difference between the first torque and the second torque is larger than the first difference threshold (step A5; YES), the controller 31 determines that the friction coefficient of the paper P is relatively large (step A6) and ends the present process.

On the other hand, when the difference between the first torque and the second torque is equal to or smaller than the first difference threshold (step A5; NO), the controller 31 determines that the friction coefficient of the paper P is relatively small (step A7) and ends the present process.

That is, the controller 31 determines whether the friction coefficient of the front surface of the paper P is relatively large (larger than the first threshold value) or relatively small (equal to or smaller than the first threshold value) based on the driving torque of the intermediate transfer driving motor 346*a* (driver) when the paper P (continuous paper) is pressed and conveyed by the intermediate transfer belt 342 (the image carrier). The first threshold value is set in advance.

Instead of performing the friction coefficient determination process, the controller 31 may determine whether the friction coefficient of the front surface of the paper P is relatively large or small based on the information of the paper type acquired in the step S1. The type of paper indicates smoothness of the paper P (continuous paper) to the intermediate transfer belt 342 (the image carrier) at the transfer position by the transfer device.

When the paper type is, for example, a coated paper or a resin-film system, the controller 31 determines that the friction coefficient of the front surface of the paper P is relatively large. When the paper type is, for example, an uncoated paper such as plain paper, the controller 31 determines that the friction coefficient of the paper P is relatively small.

However, since the friction coefficient of the surface of the paper depends on the material of the paper and the uneven shape of the surface, the friction coefficient of the surface of the paper may not be accurately determined only by the type of the paper. Therefore, it is preferable that the friction coefficient of the front surface of the paper is determined by performing the friction coefficient determination process of the step S3.

Note that the information about the continuous paper in the present embodiment includes information about the paper information and information about the friction coefficient of the paper P (continuous paper) such as the determination result in the step S3.

Next, the controller 31 acquires a first correction value for correcting the target speed from the first correction value table based on the paper information acquired in the step S1, the coverage acquired in the step S2, and the determination result in the step S3 (step S4).

Figures 7, 8:
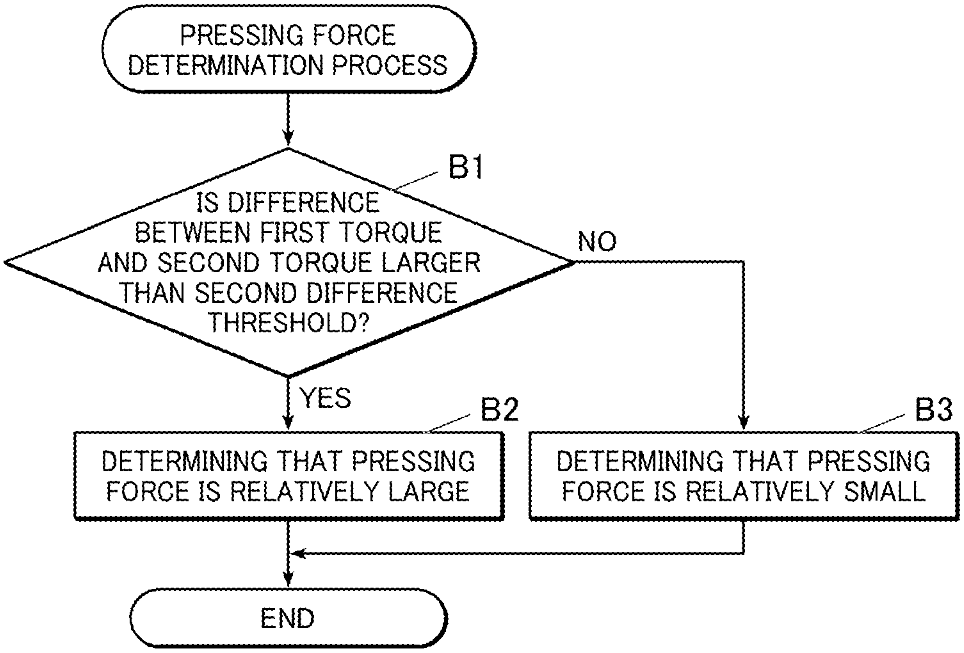
FIG. 7 is a diagram illustrating an example of a first correction value table.
FIG. 8 is a flowchart illustrating a flow of a pressing force determination process.

FIG. 7 illustrates an example of the first correction value table.

As illustrated in FIG. 7, the first correction value is a value for correcting the target speed such that the target speed gradually decreases as the thickness of the paper P increases.

The first correction value may be a value for correcting the target speed such that the target speed gradually decreases as the thickness of the paper P increases.

That is, the controller 31 adjusts the target value of the conveyance speed of the paper P such that the target value gradually or gradually decreases as the thickness of the paper P (continuous paper) increases.

The above will be described below.

As described with reference to FIG. 3, as the thickness of the paper P increases, the conveyance speed V2 of the paper P detected by the speed detection roller 381 becomes lower than the conveyance speed V1 (actual speed) at the speed center line of the paper P. In addition, the controller 31 performs control so that the conveyance speed V2 of the paper P detected by the speed detection roller 381 matches the target speed. Therefore, in order to prevent the conveyance speed V1 (actual speed) at the speed center line of the paper P from becoming higher than the target speed, the target speed is corrected so as to be lower.

Further, as shown in FIG. 7, the first correction value when an image having a relatively small coverage (which is equal to or smaller than the second threshold) is a value for correcting the target speed such that the target speed becomes higher than the target speed when an image having a relatively large coverage (which is larger than the second threshold) is formed.

That is, the controller 31 adjusts the target value of the conveyance speed of the paper P such that the target value when the coverage is equal to or smaller than the second threshold is higher than the target value when the coverage is larger than the second threshold value.

The above will be described below.

When an image having a relatively small coverage is formed, the paper P is less likely to slip to the intermediate transfer belt 342 at the transfer position. Therefore, slack of the paper P between the transfer device and the fixer 36 is likely to occur. Therefore, when an image having a relatively small coverage is formed, the target speed is corrected to be higher than the target speed when an image having a relatively large coverage is formed, in order that slack of the paper P does not occur.

Further, as shown in FIG. 7, the first correction value when the friction coefficient of the surface of the paper P is relatively large (larger than the first threshold value) is a value for correcting the target speed such that the target speed becomes lower than the target speed when the friction coefficient of the surface of the paper P is relatively small (equal to or smaller than the first threshold value).

That is, the controller 31 adjusts the target value of the conveyance speed of the paper P such that the target value becomes lower than the target value when the friction coefficient of the surface of the paper P is equal to or smaller than the first threshold value when the friction coefficient of the surface of the paper P is larger than the first threshold value.

The above will be described below.

If the friction coefficient of the surface of the paper P is relatively large, if there is a speed difference between the surface speed of the intermediate transfer belt 342 and the conveyance speed of the paper P, the paper P slips in a stick-slip manner with respect to the intermediate transfer belt 342. Therefore, it is preferable that the speed difference between the surface speed of the intermediate transfer belt 342 and the conveyance speed of the paper P be relatively small.

On the other hand, when the friction coefficient of the surface of the paper P is relatively small, the paper P is constantly minutely slipped to the intermediate transfer belt 342 if there is a speed difference between the surface speed of the intermediate transfer belt 342 and the conveyance speed of the paper P. Therefore, the transfer deviation is less conspicuous. Further, the paper P (for example, plain paper) having a relatively small friction coefficient of the surface has smaller rigidity than the paper P (for example, coated paper) having a relatively large friction coefficient of the surface. Therefore, when the friction coefficient of the surface of the paper P is relatively small, slack of the paper P between the transfer device and the fixer 36 is more likely to occur than when the friction coefficient of the surface of the paper P is relatively large. Therefore, when the friction coefficient of the surface of the paper P is relatively small, correction is performed so as to make the target speed higher than the target speed when the friction coefficient of the surface of the paper P is relatively large.

Next, the controller 31 performs a pressing force determination process for determining whether the transfer pressure (pressing force) that is the pressure of the secondary transfer roller 343 to the opposite roller 344 is relatively large (larger than a third threshold value) or relatively small (equal to or smaller than the third threshold value) (step S5). The third threshold value is set in advance, and is, for example, a standard setting value.

When the pressing force by the secondary transfer roller 343 is relatively small, the conveying force for conveying the paper P is relatively weak, and the paper P is subjected to tension from the paper feeder 10, so that slack of the paper P between the transfer device and the fixer 36 is unlikely to occur.

On the other hand, when the pressing force by the secondary transfer roller 343 is relatively large, the conveying force for conveying the paper P is relatively strong, and slack of the paper P between the transfer device and the fixer 36 is likely to occur.

FIG. 8 illustrates a flowchart of the pressing force determination process.

In the pressing force determination process, the controller 31 determines whether or not the difference between the first torque acquired in the step A2 of the friction coefficient determination process and the second torque acquired in the step A4 is larger than a predetermined second difference threshold (step B1). The second difference threshold is set in advance.

When the difference between the first torque and the second torque is larger than the second difference threshold (step B1; YES), the controller 31 determines that the pressing force by the secondary transfer roller 343 is relatively large (step B2) and ends the present process.

On the other hand, when the difference between the first torque and the second torque is equal to or smaller than the second difference threshold (step B1; NO), the controller 31 determines that the pressing force by the secondary transfer roller 343 is relatively small (step B3) and ends the present process.

That is, the controller 31 determines whether the pressing force by the secondary transfer roller 343 is relatively large (larger than the third threshold value) or relatively small (equal to or smaller than the third threshold value) based on the driving torque of the intermediate transfer driving motor 346*a* (driver) when the paper P (continuous paper) is pressed against the intermediate transfer belt 342 (the image carrier) to be conveyed.

Instead of the pressing force determination process, the controller 31 may determine whether the pressing force by the secondary transfer roller 343 is relatively large or relatively small based on only the first torque acquired in the step A2 of the friction coefficient determination process.

In this case, the storage 32 stores in advance a reference torque for each paper type which is a driving torque of the intermediate transfer driving motor 346*a* when the paper is conveyed while the pressing force of the secondary transfer roller 343 is set to be a reference value. Further, the storage 32 stores a fourth threshold that is larger than the reference torque by a predetermined value.

Specifically, when the first torque is larger than the fourth threshold, the controller 31 determines that the pressing force by the secondary transfer roller 343 is relatively large. On the other hand, when the first torque is equal to or smaller than the fourth threshold value, the controller 31 determines that the pressing force by the secondary transfer roller 343 is relatively small.

Next, the controller 31 acquires a second correction value for correcting the target speed from the second correction value table based on the determination result in the step S5 (step S6).

Figures 9, 10:
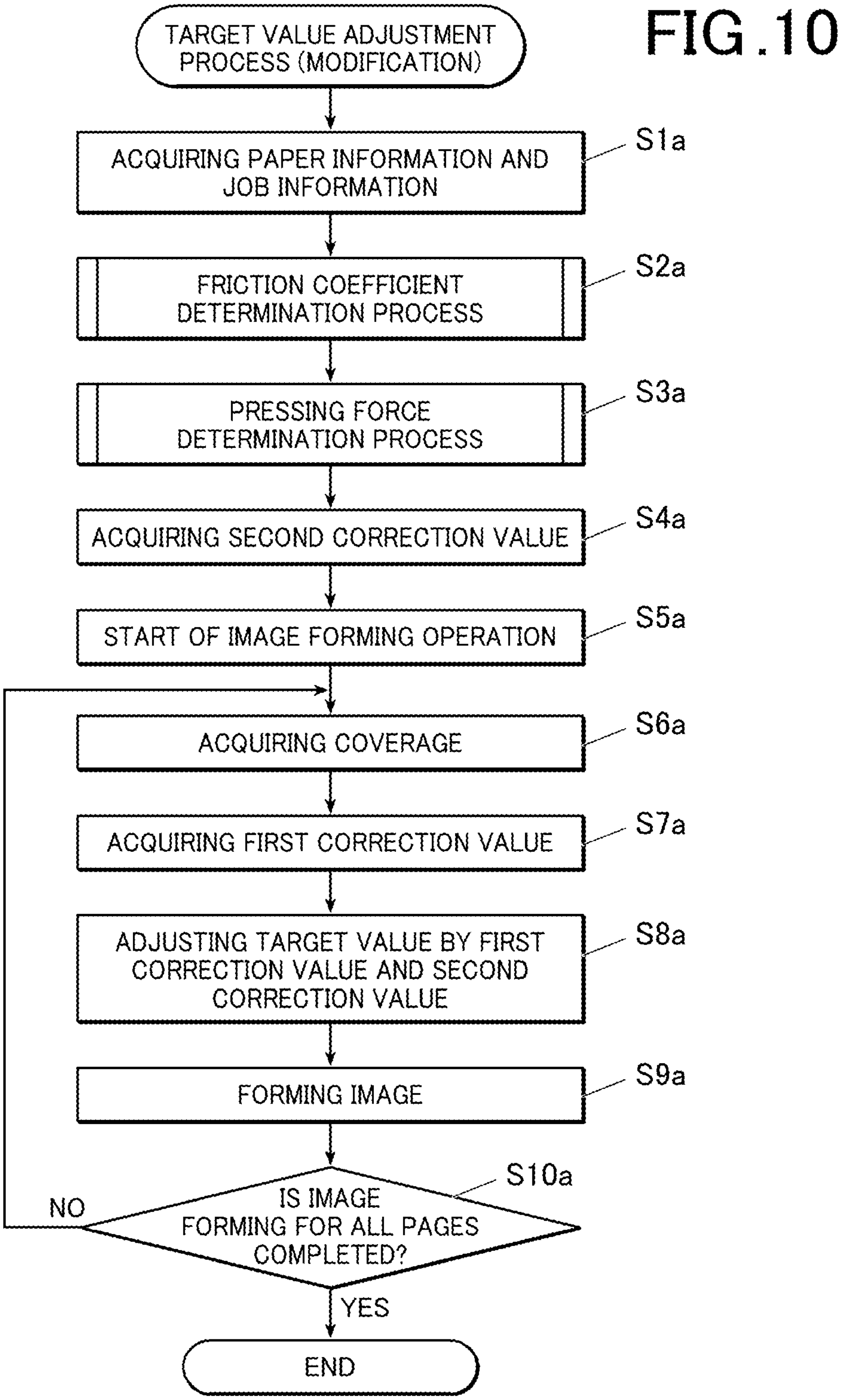
FIG. 9 is a diagram illustrating an example of a second correction value table.
FIG. 10 is a flowchart illustrating a flow of a target value adjustment process of a modification.

FIG. 9 illustrates an example of the second correction value table.

As illustrated in FIG. 9, the second correction value when the pressing force by the secondary transfer roller 343 is relatively large (larger than the third threshold value) is +0.1%, and the second correction value when the pressing force is relatively small (equal to or smaller than the third threshold value) is −0.1%.

That is, the controller 31 adjusts the target value of the conveyance speed of the paper P such that the target value when the pressing force by the secondary transfer roller 343 (the transfer member) is smaller than the third threshold value becomes lower than the target value when the pressing force is equal to or larger than the third threshold value.

The above will be described below.

When the pressing force by the secondary transfer roller 343 is relatively small, slack of the paper P between the transfer device and the fixer 36 is unlikely to occur. Therefore, in order to suppress the transfer deviation, the target speed is corrected so as to be lower than the target speed when the pressing force is relatively large.

On the other hand, when the pressing force by the secondary transfer roller 343 is relatively large, slack of the paper P between the transfer device and the fixer 36 is likely to occur. Therefore, when the pressing force is relatively large, the target speed is corrected to be higher than the target speed when the pressing force is relatively small so that slack of the paper P between the transfer device and the fixer 36 does not occur.

Next, the controller 31 adds the first correction value acquired in the step S4 and the second correction value acquired in the step S6. Then, the controller 31 adjusts the target speed (the target value of the conveyance speed of the paper P) by correcting the setting value of the conveyance speed of the paper P before the target value adjustment process is performed based on the added correction value (step S7) and ends this process.

That is, the controller 31 adjusts the target value of the conveyance speed of the paper P (continuous paper) based on at least one of the information about the continuous paper (the information about the thickness of the paper P and the friction coefficient of the front surface of the paper P) and the information about the job (coverage in the print image data).

Modification

Next, a modification of the present invention will be described. In the modification, the same components as those of the above-described embodiment are denoted by the same reference numerals, and the description thereof will be omitted.

In the present modification, the controller 31 detects the coverage in the print image data during the image forming job (image forming operation) of the image forming apparatus 100. Here, the controller 31 functions as the coverage detector.

The controller 31 adjusts the target speed (target value of the conveyance speed of the paper P) based on the coverage detected by the coverage detector during the image forming job of the image forming apparatus 100.

FIG. 10 is a flowchart illustrating a target value adjustment process according to the present modification.

In the target value adjustment process of the present modification, first, the controller 31 performs the same step S1*a*~S4*a* as the step S1, S3, S5, S6 of the target value adjustment process of the above-described embodiment prior to the image forming operation of the image forming apparatus 100.

Next, the controller 31 starts an image forming operation of an image for printing on the paper P (step S5*a*).

Next, the controller 31 acquires (detects) the coverage in the print image data based on the print image data (step S6*a*). Specifically, the controller 31 calculates the coverage in the print image data for a page which is subjected to the next image forming.

Next, the controller 31 acquires a first correction value for correcting the target speed from the first correction value table based on the paper information acquired in the step S1*a*, the determination result in the step S2*a*, and the coverage detected in the step S6*a* (step S7*a*).

Next, the controller 31 adds the first correction value acquired in the step S7*a* and the second correction value acquired in the step S4*a*. Then, the controller 31 adjusts the target speed (the target value of the conveyance speed of the paper P) by correcting the setting value of the conveyance speed of the paper P by the added correction value (step S8*a*).

Next, the controller 31 conveys the paper P at the target speed adjusted in the step S8*a* and forms an image on the paper P based on the print image data (step S9*a*).

Next, the controller 31 determines whether the image forming for all the pages of the print job is completed (step S10*a*).

When the image forming for all the pages of the print job is not completed (step S10*a*; NO), the controller 31 shifts the present process to step S6*a*.

On the other hand, when the image forming for all the pages of the print job is completed (step S10*a*; YES), the controller 31 ends the present process.

Although the present invention has been described based on the above-described embodiment, the description in the above-described embodiment is a preferred embodiment of the image forming apparatus according to the present invention and is not limited thereto.

For example, in the above target value adjustment process, the controller 31 may adjust the target value of the conveyance speed of the paper P based on basis weight of the paper included in the paper information. The storage 32 stores a first correcting table based on basis weight of the paper.

In the target value adjustment process, the controller 31 may adjust the target speed (target value of the conveyance speed of the paper P) by correcting the setting value of the conveyance speed of the paper P only by the first correction value in the step S7 without performing the steps S5 and S6.

Further, in the step S4 of the target value adjustment process, the controller 31 may acquire the first correction value for correcting the target speed based on at least one of the paper information acquired in the step S1, the coverage acquired in the step S2, and the determination result in the step S3.

In the above-described embodiment, the controller 31 adjusts the target value of the conveyance speed of the paper P, but the present invention is not limited thereto. Instead of adjusting the target value, the controller 31 may adjust the detection result detected by the speed detector 38 based on at least one of the information about the continuous paper and the information about the job and control the conveyance speed so that the adjusted detection result matches the target value.

3. Effect

As described above, the image forming apparatus 100 according to the present embodiment includes a conveyor 35 that conveys continuous paper (paper P), a speed detector 38 that contacts the continuous paper conveyed by the conveyor 35 to detect a conveyance speed of the continuous paper, and a controller 31 that controls the conveyor 35 based on a detection result detected by the speed detector 38 so that the conveyance speed of the continuous paper reaches a target value, wherein the controller 31 adjusts the target value based on at least one of information about the continuous paper and information about a job. Alternatively, the controller 31 adjusts the detection result by the speed detector 38 based on at least one of information about the continuous paper and information about a job.

Therefore, the conveyance speed of the paper can be controlled to be an appropriate speed based on at least one of the information about the continuous paper and the information about the job. As a result, the conveyance speed of the paper becomes an appropriate speed to a surface speed of the intermediate transfer belt 342 (the image carrier), and it is possible to further suppress a defect due to the paper conveyance.

Further, in the image forming apparatus 100 according to the present embodiment, the controller 31 is capable of setting the conveyance speed of the continuous paper to be higher than 23.4 m/min.

Therefore, even when the paper is conveyed at a high speed (higher than 23.4 m/min), the conveyance speed of the paper becomes an appropriate speed to the surface speed of the intermediate transfer belt 342 (the image carrier), and it is possible to further suppress a defect due to the paper conveyance.

Further, in the image forming apparatus 100 according to the present embodiment, the information about the continuous paper and the information about the job include any one of a paper type of the continuous paper, a thickness of the continuous paper, a basis weight of the continuous paper, and smoothness of the continuous paper.

Therefore, the conveyance speed of the paper can be controlled to be an appropriate speed based on at least one of a paper type, a thickness, basis weight, and smoothness of the continuous paper.

Further, in the image forming apparatus 100 according to the present embodiment, the controller 31 adjusts the target value such that the target value decreases gradually or stepwise as the thickness of the continuous paper increases.

Therefore, even when the thickness of the paper P is relatively large and the conveyance speed V2 of the paper P detected by the speed detection roller 381 is lower than the conveyance speed V1 (actual speed) at the speed center line of the paper P, the conveyance speed of the paper P can be set to be an appropriate speed to the surface speed of the intermediate transfer belt 342 (the image carrier).

Further, the image forming apparatus 100 according to the present embodiment includes a transfer device (a secondary transfer roller 343 and a opposite roller 344) that transfers a toner image carried on an image carrier (intermediate transfer belt 342) to the continuous paper, wherein the smoothness is smoothness of the continuous paper at a transfer position by the transfer device, to the image carrier.

Therefore, at the transfer position, the conveyance speed of the paper P can be set to be an appropriate speed to the surface speed of the intermediate transfer belt 342 (the image carrier).

In addition, in the image forming apparatus 100 according to the present embodiment, the smoothness is a friction coefficient of a surface of the continuous paper.

Therefore, the conveyance speed of the paper can be controlled to be an appropriate speed based on the friction coefficient of the surface of the continuous paper.

In the image forming apparatus 100 according to the present embodiment, the controller 31 adjusts the target value such that the target value when the friction coefficient is larger than a first threshold value is lower than the target value when the friction coefficient is equal to or smaller than the first threshold value.

That is, when the friction coefficient is equal to or smaller than the first threshold value, the controller 31 adjusts the target speed to be higher than the target speed when the friction coefficient is larger than the first threshold value. Accordingly, slack of the paper P can be suppressed even when the friction coefficient of the front surface of the paper P is relatively small and thus slack of the paper P between the transfer device and the fixer 36 is likely to occur.

In addition, the image forming apparatus 100 according to the present embodiment includes a driver (an intermediate transfer driving motor 346*a*), that drives the image carrier, wherein the controller 31 determines whether the friction coefficient is larger than the first threshold or not based on a driving torque of the driver when the continuous paper is pressed on the image carrier to be conveyed.

Therefore, it is possible to accurately determine whether the friction coefficient of the surface of the paper P is larger than the first threshold value.

Further, in the image forming apparatus 100 according to the present embodiment, the controller 31 adjusts the target value based on the smoothness which is based on the coverage of an image formed on the continuous paper.

Therefore, the conveyance speed of the paper can be controlled to be an appropriate speed based on the coverage in the print image data.

Further, in the image forming apparatus 100 according to the present embodiment, the controller 31 adjusts the target value such that the target value when the coverage is equal to or smaller than a second threshold is higher than the target value when the coverage is larger than the second threshold value.

Therefore, slack of the paper P can be suppressed even when an image whose coverage is relatively small is formed and thus slack of the paper P between the transfer device and the fixer 36 is likely to occur.

Further, the image forming apparatus 100 according to the present embodiment includes the coverage detector that detects the coverage during an image forming job, wherein the controller 31 adjusts the target value based on the coverage detected by the coverage detector.

Therefore, even during an image forming job, the conveyance speed of the paper can be set to be an appropriate speed based on the coverage in the print image data corresponding to each page.

Further, in the image forming apparatus 100 according to the present embodiment, the transfer device includes a transfer member (secondary transfer roller 343) that presses the continuous paper on the image carrier, wherein the controller 31 adjusts the target value such that the target value when a pressing force by the transfer member is smaller than a third threshold value is lower than the target value when the pressing force is equal to or larger than the third threshold value.

In other words, when the pressing force by the secondary transfer roller 343 is relatively large, the controller 31 adjusts the target speed to be higher than the target speed when the pressing force is relatively small. Therefore, slack of the paper P between the transfer device and the fixer 36 can be suppressed even when the pressing force by the secondary transfer roller 343 is relatively large and thus slack of the paper P between the transfer device and the fixer 36 is likely to occur.

In addition, the image forming apparatus 100 according to the present embodiment includes a driver that drives the image carrier, wherein the controller 31 determines whether the pressing force is smaller than the third threshold or not based on a driving torque of the driver when the continuous paper is pressed on the image carrier to be conveyed.

Therefore, it is possible to accurately determine whether the pressing force by the secondary transfer roller 343 is smaller than the third threshold.

Although the present invention has been described based on the above-described embodiments the description in the above-described embodiment is a preferred embodiment of the image forming apparatus according to the present invention and is not limited thereto.

For example, instead of the pressing force determination process, the controller 31 may determine whether the pressing force by the secondary transfer roller 343 is larger than the third threshold value or equal to or smaller than the third threshold value based on a signal from a load cell incorporated in a bearing of the secondary transfer roller 343.

In addition, instead of the pressing force determination process, the controller 31 may determine whether the pressing force by the secondary transfer roller 343 is larger than the third threshold value or equal to or smaller than the third threshold value based on a distance between shafts of the secondary transfer roller 343 and the secondary transfer roller 343.

In the above embodiment, the image forming apparatus 100 forms an image on the paper P, which is a continuous paper that can be wound, but the present invention is not limited thereto. The image forming apparatus 100 may perform image forming on a sheet of paper or the like that is not continuous paper.

Also, when image forming is performed on a sheet of paper, slack of paper between the transfer position and the fixer occurs if the paper conveyance speed is lower than the surface speed of the intermediate transfer belt 342. However, the slack of the paper is eliminated when the rear end of the paper exits the secondary transfer nip 345 since the paper is a sheet of paper. Therefore, the present invention is particularly effective in the case of forming an image on continuous paper.

In addition, specific details such as the configuration, structure, control contents, and order described in the above embodiment can be appropriately changed without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming apparatus comprising:

a conveyor that conveys continuous paper, a speed detector that contacts the continuous paper conveyed by the conveyor to detect a conveyance speed of the continuous paper, and a hardware processor that controls the conveyor based on a detection result detected by the speed detector so that the conveyance speed of the continuous paper reaches a target value, wherein the hardware processor adjusts the target value based on at least one of information about the continuous paper and information about a job;

wherein the conveyor conveys the continuous paper at the adjusted target value.

2. The image forming apparatus according to claim 1, wherein the hardware processor is capable of setting the conveyance speed of the continuous paper to be higher than 23.4 m/min.

3. The image forming apparatus of claim 1, wherein after the hardware processor adjusts the target value, image forming occurs.

4. The image forming apparatus according to claim 1, wherein either of the information about the continuous paper or the information about the job includes any one of a paper type of the continuous paper, a thickness of the continuous paper, a basis weight of the continuous paper, and potential for slippage of the continuous paper.

5. The image forming apparatus according to claim 4, wherein the hardware processor adjusts the target value such that the target value decreases gradually or stepwise as the thickness of the continuous paper increases.

6. The image forming apparatus according to claim 4, further comprising a transfer device that transfers a toner image carried on an image carrier to the continuous paper, wherein the potential for slippage is potential for slippage of the continuous paper at a transfer position where the transfer device meets the image carrier.

7. The image forming apparatus according to claim 6, wherein the potential for slippage is a friction coefficient of a surface of the continuous paper on the image carrier.

8. The image forming apparatus according to claim 7, wherein the hardware processor adjusts the target value such that the target value when the friction coefficient is larger than a first threshold value is lower than the target value when the friction coefficient is equal to or smaller than the first threshold value.

9. The image forming apparatus according to claim 8, further comprising a driver that drives the image carrier, wherein the hardware processor determines whether the friction coefficient is larger than the first threshold or not based on a driving torque of the driver when the continuous paper is pressed on the image carrier to be conveyed.

10. The image forming apparatus according to claim 6, wherein the hardware processor adjusts the target value based on the potential for slippage which is based on a coverage of an image formed on the continuous paper.

11. The image forming apparatus according to claim 10, wherein the hardware processor adjusts the target value such that the target value when the coverage is equal to or smaller than a second threshold is higher than the target value when the coverage is larger than the second threshold value.

12. The image forming apparatus according to claim 11, further comprising a coverage detector that detects the coverage during an image forming job, wherein the hardware processor adjusts the target value based on the coverage detected by the coverage detector.

13. The image forming apparatus according to claim 6, wherein the transfer device includes a transfer member that presses the continuous paper on the image carrier, wherein the hardware processor adjusts the target value such that the target value when a pressing force by the transfer member is smaller than a third threshold value is lower than the target value when the pressing force is equal to or larger than the third threshold value.

14. The image forming apparatus according to claim 13, further comprising a driver that drives the image carrier, wherein the hardware processor determines whether the pressing force is smaller than the third threshold or not based on a driving torque of the driver when the continuous paper is pressed on the image carrier to be conveyed.

* * * * *